United States Patent

Walter et al.

[11] Patent Number: 5,612,497
[45] Date of Patent: Mar. 18, 1997

[54] ADAPTOR FOR MONITORING A PRESSURE SENSOR TO A GAS TURBINE HOUSING

[75] Inventors: Hilger A. Walter, Stade; Herwart Hönen, Uebach-Palenberg; Heinz E. Gallus, Aachen, all of Germany

[73] Assignee: Dow Deutschland Inc., Germany

[21] Appl. No.: 246,907

[22] Filed: May 20, 1994

Related U.S. Application Data

[63] Continuation-in-part of PCT/US93/05764, Jun. 16, 1993, published as WO94/03862, Feb. 17, 1994.

[30] Foreign Application Priority Data

Aug. 10, 1992 [EP] European Pat. Off. ............... 92113585

[51] Int. Cl.⁶ ........................................... G01L 7/00
[52] U.S. Cl. ........................................... 73/756
[58] Field of Search ........................... 73/706, 721, 727, 73/756; 134/169 R; 137/156 R

[56] References Cited

U.S. PATENT DOCUMENTS

| | | | |
|---|---|---|---|
| 3,003,970 | 10/1961 | Call | 252/152 |
| 3,132,562 | 5/1964 | Frevel | 89/1.7 |
| 3,216,244 | 11/1965 | Borchers | 73/115 |
| 3,244,006 | 4/1966 | Delmonte | 73/398 |
| 3,259,650 | 7/1966 | Decker et al. | 260/515 |
| 3,468,322 | 9/1969 | Katzer | 137/1 |
| 3,581,572 | 6/1971 | Frick | 73/406 |
| 3,679,382 | 7/1972 | Cohrs et al. | 44/7 |
| 3,820,963 | 6/1974 | Moore et al. | 44/62 |
| 3,963,367 | 6/1976 | Stalker et al. | 415/17 |
| 4,026,111 | 5/1977 | Matthews | 60/641 |
| 4,052,857 | 10/1977 | Altschuler | 60/641 |
| 4,055,994 | 11/1977 | Roslyng et al. | 73/116 |
| 4,058,015 | 11/1977 | Stode | 73/395 |
| 4,072,619 | 2/1978 | Williams et al. | 252/47.5 |
| 4,196,472 | 4/1980 | Ludwig et al. | 364/431 |
| 4,216,672 | 8/1980 | Henry et al. | 73/115 |

(List continued on next page.)

FOREIGN PATENT DOCUMENTS

| | | |
|---|---|---|
| 0024823 | of 0000 | European Pat. Off. . |
| 0465696 | of 0000 | European Pat. Off. . |
| 2248427 | 5/1975 | France . |
| 3605958 | of 0000 | Germany . |
| 2049338 | of 0000 | Germany . |
| 57-129297 | 8/1982 | Japan . |
| 2191606 | of 0000 | United Kingdom . |

OTHER PUBLICATIONS

*Combusion and Flame*, vol. 25, No. 1, 1 Aug. 1975, New York, pp. 5–14 Y. Mizutani et al., "A Study on the Structure of Premixed Turbulent Flames by the Microphone–Probe Technique", pp. 6–7.

Int'l Patent Appl. No. PCT/US93/05765, filed June 16, 1993.

(List continued on next page.)

*Primary Examiner*—Richard Chilcot
*Assistant Examiner*—William L. Oen
*Attorney, Agent, or Firm*—Dale H. Schultz

[57] ABSTRACT

The invention relates to an adaptor for mounting a pressure sensor for a high temperature system comprising a sensor carrier means with an axis of elongation, said carrier means being provided at one axial end thereof with mounting means for sealingly mounting said carrier means in a hole of the wall, with an end face of said carrier means within said borescope hole being provided with an opening for entrance of pressure fluid from the interior of the gas tubine wall into said carrier means, said carrier means further being provided at the other axial end thereof with a recess for sealingly receiving the pressure sensor. The adaptor further comprises a tube means extending through said carrier means parallel to said axis of elongation with one end of said tube means being in fluid connection with said recess and the other end of said tube means being in fluid connection with said opening, said tube means thus forming at least part of a fluid channel, said fluid channel connecting said recess with said opening. The adaptor provides for cooling of the pressure sensor and enables the measurement of high frequency variations.

20 Claims, 1 Drawing Sheet

U.S. PATENT DOCUMENTS

| | | | |
|---|---|---|---|
| 4,252,498 | 2/1981 | Radcliffe et al. | 415/26 |
| 4,256,511 | 3/1981 | Atchison et al. | 134/46 |
| 4,311,040 | 1/1982 | Long | 73/115 |
| 4,322,977 | 4/1982 | Sell et al. | 73/701 |
| 4,364,266 | 12/1982 | Williams | 73/115 |
| 4,414,817 | 11/1983 | Jernigan | 60/641.2 |
| 4,422,125 | 12/1983 | Antonazzi et al. | 361/283 |
| 4,422,333 | 12/1983 | Leon | 73/660 |
| 4,422,335 | 12/1983 | Ohnesorge et al. | 73/724 |
| 4,434,664 | 3/1984 | Antonazzi et al. | 73/701 |
| 4,449,409 | 5/1984 | Antonazzi | 73/724 |
| 4,457,179 | 7/1984 | Antonazzi et al. | 73/701 |
| 4,500,500 | 2/1985 | Paalman et al. | 423/224 |
| 4,528,817 | 7/1985 | Jernigan | 60/641.2 |
| 4,604,702 | 8/1986 | Zwicke | 364/431.02 |
| 4,618,856 | 10/1986 | Antonazzi | 340/626 |
| 4,625,280 | 11/1986 | Couch | 364/431.02 |
| 4,629,608 | 12/1986 | Lampton, Jr. et al. | 423/226 |
| 4,648,711 | 3/1987 | Zachary | 356/44 |
| 4,808,235 | 2/1989 | Woodson et al. | 134/22.19 |
| 4,902,563 | 2/1990 | McCullough, Jr. et al. | 428/284 |
| 4,921,683 | 5/1990 | Bedell | 423/235 |
| 4,926,620 | 5/1990 | Donle | 55/89 |
| 4,978,571 | 12/1990 | McCullough, Jr. et al. | 428/263 |
| 4,989,159 | 1/1991 | Liszka et al. | 364/508 |
| 4,995,915 | 2/1991 | Sewell et al. | 134/22.14 |
| 5,165,845 | 11/1992 | Khalid | 415/17 |

OTHER PUBLICATIONS

European Patent Appl. No. 92113607.3, filed Aug. 10, 1992.
Int'l Patent Appl. No. PCT/US93/05764, filed Jun. 16, 1993.
European Patent Appl. No. 92113586.9, filed Aug. 10, 1992.
Int'l Patent Appl. No. PCT/US93/05766, filed Jun. 16, 1993.
European Patent Appl. No. 92113606.5 filed Aug. 10, 1992.
Int'l Patent Appl. No. PCT/US93/05768, filed Jun. 16, 1993.
European Patent Appl. No. 92113585.1, filed Aug. 10, 1992.
"Fast Response Wall Pressure Measurement as a Means of Gas Turbine Blade Fault Identification", K. Nathiodakis et al., Gas Turbine & Aeroengine Congress Expo, Brussels, Belgium, Jun. 11–14 1990, ASME Paper No. 90–GT. 341.
"Rotating Waves as a Stall Inception Indication in Axial Compressors", V.H. Garnier et al., Gas Turbine & Aeroengine Congress and Expo, Brussels, Belgium ASME paper No. 90–GT–156.
Hönen, Herwart, "Experimental Studies of the Three–Dimensional Unsteady Flow Behavior in a Subsonic Axial Compressor Stage," Jun. 24, 1987.

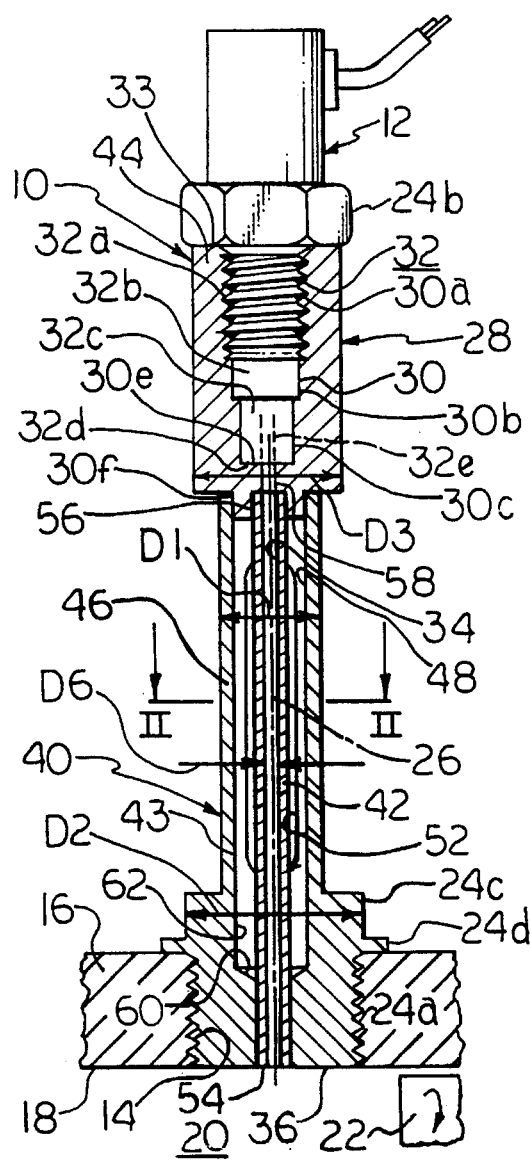
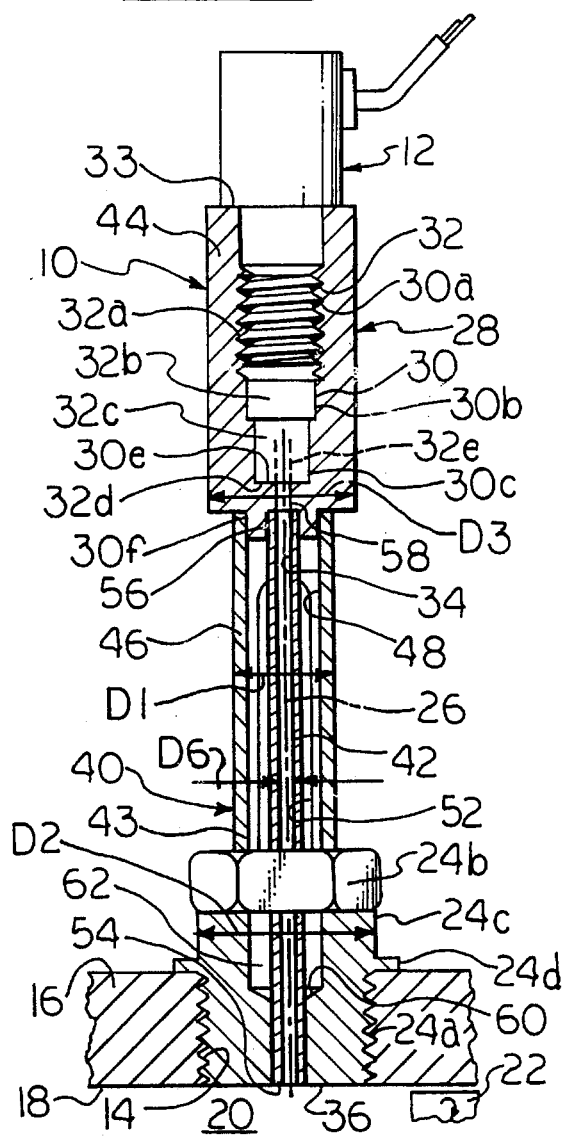
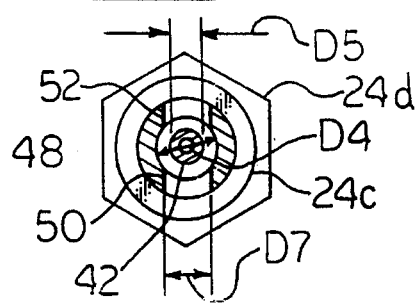
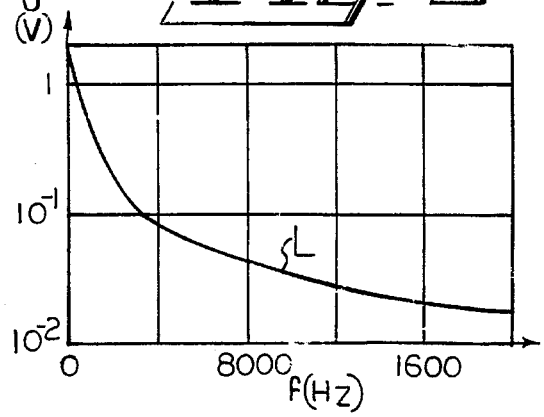

ADAPTOR FOR MONITORING A PRESSURE SENSOR TO A GAS TURBINE HOUSING

CROSS-REFERENCE TO RELATED APPLICATION

This application is a continuation-in-part application of International Patent Application No. PCT/US93/05768 which was filed on Jun. 16, 1993, published as WO94/03862, Feb. 17, 1994, and which designates the United States of America, and which claims International Priority from European Patent Application No. 92113585.1 which was filed on Aug. 10, 1992.

FIELD OF THE INVENTION

The invention relates to an adaptor for mounting a gas pressure sensor to a wall of a housing of a high temperature system, such as a gas turbine or a chemical reactor, for example plug flow reactor.

Gas turbines are used for driving airplanes, ships or large vehicles and as part of power plants. In both cases, the reliability of the gas turbines is a extremely important factor. In order to improve the operating reliability and, thus, to prevent or reduce costly and dangerous break downs, a diagnosis of the engine in intervals or in on-line monitoring is of crucial importance. The static and/or dynamic pressure in the various stages of the gas turbine is an important parameter to be observed for diagnosis and for monitoring the functioning of the gas turbine. From ASME paper no. 90-Gt-341 it is known to carry out pressure measurements with a pressure sensor attached to the turbine wall. Also in case of chemical reactors, the observation of dynamic pressure variations is important for controlling the process.

The temperature range in which the pressure sensor is to be used in connection with the high temperature systems, goes up to relatively high temperatures. In a high pressure compressor, for example, the rear stages may exhibit temperatures of up to 600° C. with a correspondingly high wall temperature. However, the maximum operating temperature of common commercially available pressure sensors, especially dynamic pressure sensors, is well below this temperature value (e.g., 200° C. in case of the Kistler pressure sensor, type 6031), with the exception of special sophisticated and, therefore, expensive sensors.

SUMMARY OF THE INVENTION

It is an object of the present invention to provide a frequency selective adaptor or frequency resonant adaptor which allows the use of a pressure sensor operating in a temperature interval well below the maximum temperature of the housing with little influence on the accuracy of the pressure measurement.

It is a further object of the invention is to provide an adaptor to be used in connection with pressure sensors with lower temperature operating range than the maximum housing temperature, which adaptor is of rugged design and operates without cooling liquid.

A further object of the invention is to provide a frequency selective adaptor which enables measurement of high frequency pressure variations at frequencies less than about 10,000 Hz.

A further object of the invention is to provide an adaptor best suited for being mounted to a gas turbine wall.

One aspect of the invention relates more specifically to the combination of an adaptor and pressure sensor for attachment to the exterior side of a wall to measure pressure variations in a space interior to the wall, said combination comprising:

(a) as the adaptor, a carrier means having a hollow middle portion, and oppositely disposed first and second end portions;

(b) means in the first end portion for mounting the carrier means in a hole defined in the wall so that the hollow middle portion and second end portion extend in a direction outwardly and away from the exterior surface of the wall;

(c) a pressure sensor affixed to the carrier means remote from said first end portion and separated therefrom by the hollow middle portion of the carrier means, whereby the pressure sensor is remotely positioned from the wall on the exterior side thereof;

(d) an opening defined in the first end portion which provides communication with the space interior to the wall;

(e) the carrier means defining a generally sealed, internal space communicating between the opening in the first end portion and the remotely positioned pressure sensor;

(f) said generally sealed internal space being defined in part by the bore of an elongated tube means, said tube means being in communication with the opening in the first end portion and extending through the hollow middle portion of the carrier means, whereby pressure variations in the space interior to the wall are communicated to the remotely positioned pressure sensor through the bore of the tube means.

Still another aspect of the invention relates to an adaptor which comprises a sensor carrier means or elongated structural support member with an axis of elongation, said carrier means being provided at one axial end thereof with mounting means for sealingly mounting said carrier means in a hole of the wall, with an end face of said carrier means within said hole being provided with an opening for entrance of pressure fluid from the interior of the gas turbine wall into said carrier means, said carrier means at the other axial end having as a preferred embodiment of the invention, a circular perimeter defining a cylindrical recess for sealingly receiving the pressure sensor, a tube means extending through said carrier means parallel to said axis of elongation with one end of said tube means being in fluid connection with said recess and the other end of said tube means being in fluid connection with said opening.

The elongated sensor carrier provides for the necessary temperature gradient between the hot wall at one end of said carrier means and the pressure sensor at the other end thereof. The tube means connecting the interior of the housing with the pressure sensor has a well-defined, frequency dependent flow resistance for the gas flow through the tube means. Therefore, accurate and reliable pressure measurements can be performed. The tube means are readily available with a high precision inner surface required for well defined flow resistance. Thin-walled tube means may be used since the mechanical stability of the adaptor is provided by the separate sensor carrier means. By choosing a tube means with tube means length and tube means diameter being determined such that only a very small fluid volume is defined within the adaptor, high frequency pressure variations within housing with frequencies up to 10,000 Hz and higher may be detected by the pressure sensor.

In a preferred embodiment the carrier means comprises, at said one end thereof, a first end portion which is threaded in order to be secured in the hole of the wall, for example in a borescope hole of a gas turbine wall, said tube means being fastened to said first end portion in the region of said one end of said tube means. Thus, the common borescope holes in the compressor walls of the gas turbine can be used for mounting the pressure sensor. No further holes have to be drilled into the gas turbine wall.

Said carrier means may comprise at said other end thereof a second end portion provided with said recess, said tube means being fastened to said second end portion in the region of said other end of said tube means. In this way, most of the length of the carrier means between said first and said second end portions thereof is used for producing the temperature gradient. This ensures a relatively compact construction.

Furthermore, said carrier means may comprise a middle portion connecting said first and said second end portion, said middle portion having no direct contact with said tube means. This separation of tube means and carrier means ensures rapid cooling, especially when using a preferred embodiment of the invention, wherein said middle portion is formed by a hollow cylindrical shaft having a cylinder axis extending along said axis of elongation, said tube means extending through said middle portion along said cylinder axis with clear distance between said tube means and said shaft. The preferred hollow cylindrical space between said tube means and said wall provides for additional cooling especially in case of said shaft being provided with at least one hole for allowing entrance and exit of cooling fluid to the outer surface of said tube means. Equivalent structures to a hollow cylindrical middle portion could, for example, comprise a cage or even possibly a single leg structure which would leave the middle portion of the adaptor an open space (i.e. hollow) to provide the above discussed temperature gradient to exist without detrimentally interfering with the necessary functionality of the tube means.

For rapid cooling, it is possible to circulate cooling gas or cooling liquid through said hollow cylindrical space. However, if at least two elongated holes are provided, each with an axis of elongation extending parallel to the cylinder axis, the cooling by air entering into and exiting from the respective one of the 30 two elongated holes, may suffice. The regular cooling air for cooling the housing of high temperature systems, for example the gas turbine wall, may also be used for cooling the adaptor without additional measures.

To optimize the overall thermal conductivity of the adaptor, the outside diameter of the hollow cylindrical shaft should be essentially limited to a maximum of about two thirds of the outside diameter of the second end portion; this minimizes heat transfer to the second end portion while retaining structural strength. Furthermore, the mounting space needed for the adaptor is reduced which is important, since at the outside of the gas turbine wall there is an actuator system with many rods (mechanical control linkages) for actuating turbine compressor adjustments.

In order to facilitate the mounting of the adaptor, said first end portion is provided with a polygonal section for engagement with a screwing tool.

Said carrier means and said tube means may comprise steel alloy parts having high mechanical strength and high temperature resistance.

The best results were obtained with V4A-steel alloy. This material has nearly the same thermal expansion coefficient as the commonly used material of the gas turbine wall, so that leakage problems due to different thermal expansion are avoided.

Preferred dimensions of the tube means are an inner diameter between 0.4 mm and 1.2 mm and a tube length between 20 mm and 100 mm. The best results are obtained with an inner diameter of approximately 1 mm and a tube length of approximately 50 mm.

It was found that the ratio of the tube length value of the tube means and the value of the inner diameter of the tube means are decisive for the transmission characteristics of the tube for high frequency pressure variations. Tubes with the same ratio essentially exhibit the same transmission characteristics. Good results were obtained with a ratio between 20 and 80. Best results were obtained with a ratio of approximately 50.

In order to obtain a high temperature resistance with sufficient mechanical strength of the tube, the thickness of the tube wall should be between 0.2 and 0.8 mm.

The transmission characteristics of the adaptor, that is, the relative attenuation of the sensor signal with respect to different pressure variation frequencies (at constant amplitude) may be determined experimentally by means of a calibrating device. For this aim, the adaptor may be mounted to a reference pressure source with a variable pressure pulse frequency.

It was found that the transmission characteristics of the tube means may be approximated by the following formula for the ratio of the absolute pressure at the other end of the tube means and the absolute pressure PI at the one end of the tube means:

$$P2/P1 = a * f^b * e^{f*c}$$

with the pressure P1 at the one end of said tube means varying with a frequency f[Hz] and constants a, b and c depending on the dimensions of the tube means.

A set of parameters a, b, c may be determined for a given ratio of the value of the tube length and the value of the inner diameter by theoretical calculation or by using the aforementioned calibrating method. To determine the set of parameters, only a small sample of measurements, at least three measurements at three different frequencies, have to be performed. After determination of the set of parameters for a given ratio, the transmission characteristics of tube means with this ratio, but with different length and diameter, may be described by the above formula.

For a ratio of the value of the tube means length and the value of the inner diameter of approximately 50, the set of parameters shows the following values: a=0.416; b=−0.003; c=−0.000186.

The invention relates further to a pressure sensing device for measuring dynamic pressure variations within a gas turbine, comprising an adaptor as described above and a piezoelectric or piezoresistive pressure sensor mounted to said adaptor. Piezoelectric and piezoresistive pressure sensors generally are only operable at relatively low temperatures. On the other hand, piezoelectric and piezoresistive pressure sensors produce signals representing only the dynamic part of the pressure within the gas turbine. For many diagnoses and monitoring methods this dynamic pressure part is of main interest. Examples of such diagnoses and monitoring methods are disclosed in:

(1) Process and Device For Monitoring and For Controlling of a Compressor (PCT International Publication Number WO 94/03862 filed on Jun. 16, 1993 and published Feb. 17, 1994), (2) Process For Detecting Fouling of an Axial Compressor (PCT International Publication Number WO 94/03863 filed on Jun. 16, 1993 and published Feb. 17, 1994), and (3) Process and Device For Monitoring Vibrational Excitation of an Axial Compressor (PCT International Publication Number WO 94/03864 filed on Jun. 16, 1993 and published Feb, 17, 1994).

These three publications are hereby expressly incorporated herein by reference. Therefore, the pressure sensing device as mentioned before, is advantageous for these applications.

BRIEF DESCRIPTION OF THE DRAWING

For a better understanding of the invention reference is made to the following description and the drawings.

FIG. 1 is an axial cross-sectional view of a preferred enbodiment of an adaptor according to the invention, mounted to a gas turbine wall;

FIG. 2 is a radial cross section of the adaptor as viewed along lines II—II in FIG. 1;

FIG. 3 is a graph showing the dependency of a sensor signal with the frequency of the pressure variations to be measured; and FIG. 4 shows a modified adaptor design.

DESCRIPTION OF THE PREFERRED EMBODIMENT

Referring to the drawings, wherein equal numerals correspond to equal elements throughout, first, reference is made to FIG. 1, wherein an adaptor 10 equipped with a pressure sensor 12 is mounted to a wall 16 of a gas turbine. The wall 16 is partly broken. The lower side 18 in FIG. 1 of wall 16 defines an interior (inner) space 20 of the gas turbine, in which inner space a gas turbine rotor with blades 22 (in FIG. 1 partly shown) is rotating. The rotating blades 22 are cooperating with not shown static blades mounted to the wall 16. The adaptor 10 is preferably mounted in the region of the gap between stator blades and rotor blades of one stage of the gas turbine.

It is not necessary to drill a hole into wall 16 for mounting the pressure sensor because the pressure sensor may be mounted to the known borescope holes 14 which are used for visual inspection of the interior of the gas turbine by an endoscope device.

For this purpose, the adaptor 10 is provided with a threaded end portion 24 with a screwed section 24a to be screwed into the borescope hole 14. The first end portion 24 is further provided with a polygonal section 24b which is also shown in FIG. 2. To assure stability of the end portion 24, the polygonal section 24d is followed by a cylindrical section 24c.

The adaptor 10 is elongated with an axis of elongation 26 extending 35 between the mentioned first end portion 24 and a second end portion 28. The axis of elongation 26 coincides with the axis of the borescope hole 14. Said second end portion 28 is provided with a recess 30 for sealingly receiving a sensor head 32 of said pressure sensor 12. Said recess 30 is arranged concentrically to said axis of elongation 26 and opens into the radial end face 33 of the second end portion 28. Starting from said opening, said recess is formed by a threaded section 30a for receiving the correspondingly threaded section 32a of said sensor head 32. The threaded section 30a is followed by two stepped cylindrical sections 30b and 30c for receiving corresponding cylindrical sections 32b and 32c of the sensor head 32.

The sensor head defines a radial end face 32d having a central opening 32e for entrance of pressure fluid into the sensor head, is indicated by dashed lines in FIG. 1. A central fluid channel 34 of said adaptor 10, extending along said axis 26 between a radial end face 36 of the first end portion 24 and a radial end face 30e of said recess 30 opens into the recess 30 adjacent said hole 32e of the sensor 12. The sensor head is fitted into said recess 30 with only very small distance or clearance between said recess 30 and said sensor head so that there is only a very small (lost) volume of pressure fluid to enter into said space between sensor head 32 and recess 30. In case of the thermal expansion coefficients of the pressure head and of the material of the adaptor 10 being almost identical, it is also possible to fit said pressure head into said recess 30 with almost no clearance between the circumferential faces and the radial end faces 30e, 32d to further reduce the lost volume of pressure fluid. A very small lost volume is necessary for enabling the measurement of very high frequent pressure variations. A larger lost volume would dampen high frequency pressure variations.

The sensor 12 is sealingly mounted to adaptor 10 in the usual manner, either by employing rubber-sealing rings or metallic.sealing rings (not shown) or by using sealing edges.

The adaptor 10 consists of two main parts, namely a carrier means generally designated with numeral 40 and tube means in the shape of a single tube 42. The carrier means 40 may be of one-part construction or of the shown two-part construction with a lower part 43 and an upper part 44. The lower part 43 consists of the above-mentioned first end portion 24 and a middle portion 46 with reduced outer diameter DI (8 mm) as compared to the outer diameter D2 (14 mm) of the cylindrical section 24c of the first end portion 24 and also with respect to the outer diameter D3 (12 mm) of the second end portion 28.

In a preferred embodiment, the middle portion 42 is formed by a hollow cylindrical shaft extending along said axis 26. The diameter D4 of the central hole 48 is 6 mm and the outer diameter D1 is 8 mm as compared to outer diameter D5 of the tube 42 of 1.1 mm, with an inner diameter D6 of 1 mm. The cross section of tube 42 is shown in enlarged manner in FIG. 2. The tube length is 49 mm. The ratio of the value of the tube length and the value of the inner diameter D6 therefore is 50. This value defines the transmission characteristics of the tube for high frequency pressure fluctuations as will be described later on. The wall thickness of tube 42 defines the mechanical stability and the temperature resistance of the tube and lies between 0.2 to 0.8 mm with a preferred value of approximately 0.5 mm.

For an effective cooling of the adaptor, in order to reduce the temperature of the mounted sensor below 200° C. with the temperature of wall 16 ranging up to 600° C. (rear stages of a high pressure compressor of a gas turbine), the middle portion is provided with two opposing elongated holes 50, 52 extending parallel to the axis 26 over almost the whole length of the middle portion 46. The width D7 of each hole is approximately 4 mm with a hole length of 30 mm. These holes 50, 52 allow entrance and exit of cooling fluid, namely cooling air used for cooling the outer surface of the wall 16. The cooling air serves for cooling the outer surface of the tube 48 and the inner surface of the cylindrical shaft of the hollow cylindrical shaft forming the middle portion 46.

In order to enlarge the inner cooling surface of the adaptor the central bore 48 of the hollow shaft, forming the middle portion 46, extends into the first end portion 24 ending at half the axial length of the end portion 24. This measure also reduces the material cross-section of the adaptor 10 in this region so that the temperature resistance is increased.

At the lower end of the mentioned central bore 48, the first end portion is provided with a diameter-reduced central bore 54 which is adapted to the outer diameter of the tube 42. According to FIG. 1 the tube ends in the plane of the lower radial face 36 of the first end portion 24. The tube 42 is sealingly tight-fitted into said bore 54 in the usual manner (soldering, brazing, welding).

The upper end of the tube 42 is likewise sealingly tight-fitted into a respective hole 56 at the lower end of the second end portion 28. This hole 56 is followed up by a reduced diameter hole 58, which opens into the recess 30. Thus, the above-mentioned channel form connecting the interior 20 of the gas turbine with the opening 32e of the sensor 12 is established. The axial length of the hole 58 is only 2 mm and the diameter of said hole is 1 mm so that the fluid transmitting characteristics of said fluid channel 34 are mainly defined by the tube 42.

For mounting the parts of the adaptor 10, it is preferred to first secure the tube 42 to the first end section 28 and then to insert the free end of the tube 42 into the bore 54 which is facilitated by a conical surface 60 connecting the larger central bore 48 of said adaptor with the smaller diameter bore 54. During said insertion the free end of the middle portion 46 comes into engagement with a reduced diameter end section 30f at the lower end of the second end portion 28. The outer diameter thereof fits with the inner diameter D4 of the middle portion 46 so that soldering or welding both parts together in this region, results in a mechanically stable construction.

FIG. 4 shows an alternative adaptor design which positions polygonal section 24b in an alternative location to that depicted in FIG. 1. The alternative location enabled greater torque to be applied to the adaptor during installation and removal.

A general parts and components list for making, installing, and using the present invention is presented in Table 1. The vendor identifier in Table 1 references the information given in Table 2, which identifies the vendor's address for each vendor identifier.

TABLE 1

| Description | | Vendor |
|---|---|---|
| Dyn.press sensor | 6031 | KIST |
| Dyn.press sensor | 6001 | KIST |
| Mounting nuts and conn.nipples | 6421 | KIST |
| Mounting nuts and conn.nipples | 6421 | KIST |
| Mounting nuts | 6423 | KIST |
| Kable | 1951A0.4 | KIST |
| Kable | 1631C10 | KIST |
| Amplifier | Y5007 | KIST |
| Isolation transformer | T4948 | HAUF |
| Multipair twistet cable | | |
| Vibration pick up | 306A06 | PCB |
| Kable | 1631C10 | KIST |
| Transducer 12 channel | F483B03 | PCB |
| CRF-Vib signal 0–10 V | | VIBR |
| Low press Rotor speed | | GE |
| High press Rotor speed | | GE |
| Isolation Aplifier | EMA U-U | WEID |
| Centronics connector | | |
| Relay | 116776 | WEID |
| Industrial computer | BC24 | ACTI |
| CPU 80386/20 Mhz | | |
| Math coprocessor 80387 | | |
| RAM = 1 MB | | |
| 20MB HD | | |
| EGA | | |
| Power supply 28 V DC | | |
| 5 free 16 Bit Slots/AT-Bus | | |
| DOW 3.3 | | |
| Spectral Analyser | V5.x | STAC |
| LAN Network board | 3C501 | 3COM |

TABLE 1-continued

| Description | Vendor |
|---|---|
| 2 MB RAM/ROM Board | DIGI |
| EGA Monitor 14" | |
| Keyboard for AT-PC | |
| Instrument Rack | KNUR |
| VMS Operating System | DEC |
| Operator Interface and General Purpose Computer | |
| Microvax II Computer with 9MB, RAM, hard disk drive of 650 megabytes storage capacity | DEC |
| TEK H207 monitor | TEK |

TABLE 2

| Vendor | Address |
|---|---|
| ACTI | ACTION Instruments, Inc. |
| | 8601 Aero Drive |
| | San Diego |
| | CA 92123 USA |
| DIGI | Digitec Engineering GmbH |
| | D-4005 Meerbusch, Germany |
| GE | General Electric Co. |
| | 1 Neumann Way |
| | Mail Drop N-155 |
| | US Cincinnati OHIO |
| KIST | Kistler Instrumente GmbH |
| | Friedrich-List-Strasse 29 |
| | D-73760 Ostfildern, Germany |
| KNUR | Knuerr AG |
| | Schatzbogen 29 |
| | D-8000 Meunchen 82, Germany |
| PCB | PCB Piezotronics Inc. |
| | 3425 Walden Avenue |
| | Depew |
| | New York |
| VIBR | Vibro meter SA |
| | Post Box 1071 |
| | CH-1701 Fribourg, Germany |
| WEID | Weidmueller GmbH & Co. |
| | PF 3030 |
| | D-4930 Detmold, Germany |
| DEC | DIGITAL Equipment Corp. |
| | Maymond, Massachusetts |
| TEK | Tektronics Corp. |
| | P.O. 1000 |
| | Wilsonville, Oregon 97070-1000 USA |

FIG. 3 shows a graph with the frequency f of pressure fluctuations at the entrance side of the adaptor (at the lower end of tube 42 in FIG. 1) with constant amplitude compared with the signal in outputted from the piezoelectric sensor 12 (for example Kistler Pressure Sensor Type 6031). The frequency is indicated in Hertz (Hz) and the sensor signal in in volts (V). The measurements were effected by means of a reference pulsating pressure source which the adaptor 10 with pressure 12 was mounted to. The measurements were made in the region between 0 Hz and 20,000 Hz. At a very low frequency around 0 Hz, the sensor signal shows a value of slightly more than IV. When increasing the frequency, but keeping the amplitude constant, the value of signal in drops for example to 0.09 V at a frequency of 4000 Hz and to a value of 0.02 V at 20,000 Hz.

Solid line L in FIG. 3 is an approximation graph for the measured values. This line L is derived from the following formula:

$$P2/P1 = a * f^b * e^{f*c} \tag{1}$$

wherein P1 is the absolute pressure at the entrance end of the tube P2 is the absolute pressure at the inner end of the tube (more exactly at the upper end of short hole 58 following tube 42).

Constants a, b and c depend on the dimensions of the fluid channel 34, that is on the dimensions of tube 42 since the length of hole 58 is very short compared to the length of tube 42. For the described configuration with a tube length of 50 mm and a tube diameter of 1 mm, the constants have the following values:

a=0.416
b=−0.003
c=−0.000186.

Since constants b and c are negative, this formula (1) shows that with increasing frequency the pressure P2 is steadily decreasing with a respective decrease of the sensor signal U as shown in FIG. 3.

Using this formula, it is possible to calculate the attenuation of the sensor signal as a function of the dynamic frequency characteristics of the pressure inside the housing for all adaptor configurations with the same ratio of the value of the channel length and the inner diameter thereof. It is not necessary to effect calibration measurements when using a reference pulsating pressure source.

In those cases where the fluid channel between the entrance side of the adaptor and the sensor has irregular inner surfaces, formula 1 cannot be used; in this situation, calibrating methods will need to be utilized.

The adaptor as described above may also be used in connection with other high temperature systems like chemical reactors, for example plug flow reactor, with relatively high wall temperatures and dynamic gas pressure fluctuations within said housing to be measured.

The present invention has been described in an illustrative manner. In this regard, it is evident that those skilled in the art, once given the benefit of the foregoing disclosure, may now make modifications to the specific embodiments described herein without departing from the spirit of the present invention. Such modifications are to be considered within the scope of the present invention which is limited solely by the scope and spirit of the appended claims.

What is claimed is:

1. The combination of an adaptor and pressure sensor for attachment to the exterior side of a wall to measure pressure variations in a space interior to the wall, said combination comprising:

(a) as the adaptor, a carrier means having a hollow middle portion, and oppositely disposed first and second end portions;

(b) means in the first end portion for mounting the carrier means in a hole defined in the wall so that the hollow middle portion and second end portion extend in a direction outwardly and away from the exterior surface of the wall;

(c) a pressure sensor affixed to the carrier means remote from said first end portion and separated therefrom by the hollow middle portion of the carrier means, whereby the pressure sensor is remotely positioned from the wall on the exterior side thereof;

(d) an opening defined in the first end portion which provides communication with the space interior to the wall;

(e) the carrier means defining a generally sealed, internal space communicating between the opening in the first end portion and the remotely positioned pressure sensor;

(f) said generally sealed internal space being defined in part by the bore of an elongated tube means, said tube means being in communication with the opening in the first end portion and extending through the hollow middle portion of the carrier means, whereby pressure variations in the space interior to the wall are communicated to the remotely positioned pressure sensor through the bore of the tube means.

2. The combination of an adaptor and gas pressure sensor connected to a wall of a housing of a high temperature system, comprising a sensor carrier means with an axis of elongation, said carrier means being provided at one axial end thereof with mounting means for sealingly mounting said carrier means in a hole of the wall, with an end face of said carrier means being provided with an opening for entrance of pressure fluid from the interior of the gas turbine wall into said carrier means, said carrier means further being provided at the other axial end thereof with a recess for sealingly receiving the pressure sensor; a tube means extending through said carrier means parallel to said axis of elongation with one end of said tube means being in fluid connection with said recess and the other end of said tube means being in fluid connection with said opening, said tube means thus forming at least a part of a fluid channel, said fluid channel connecting said recess with said opening.

3. The combination according to claim 1, wherein said carrier means (40) comprises at said one end thereof a first threaded end portion (24) to be secured in the hole (14), said tube means (42, 58) being fastened to said first end portion (24) in the region of said one end of said tube means.

4. The combination according to claim 2, wherein said carrier means (40) comprises at said other end thereof a second end portion (28) provided with said recess (32), said tube means being fastened to said second end portion in the region of said other end of said tube means.

5. The combination according to claim 3, wherein said carrier means (42) comprises a middle portion (46) connecting said first and said second end portion (24, 28), said middle portion (46) having no direct contact with said tube means.

6. The combination according to claim 4, wherein said middle portion (46) is formed by a hollow cylindrical shaft having a cylinder axis extending along said axis (26) of elongation, said tube means extending through said middle portion (46) along said cylinder axis with clear distance between said tube means and said shaft.

7. The combination according to claim 5, wherein said shaft is provided with at least one hole (50, 52) for allowing cooling fluid to enter into and exit out of said hollow cylindrical shaft.

8. The combination according to claim 6, wherein said shaft is provided with at least two elongated holes (50, 52), each with an axis of elongation extending parallel to the cylinder axis.

9. The combination according to claim 5, wherein an outer diameter (DI) of said hollow cylindrical shaft is not greater than two thirds of an outer diameter (D3) of said second end portion (28).

10. The combination according to claim 2, wherein said first end portion (24) is provided with a multiple cornered section (24b) for engagement with a screwing-tool.

11. The combination according to claim 1, wherein said carrier means (40) and said tube means are steel-alloy parts.

12. The combination according to claim 10, wherein said steel-alloy is V4A-steel-alloy.

13. The combination according to claim 1, wherein said tube means comprises a tube (42) of an inner diameter of between 0.4 mm and 1.2 mm and a tube length of between 20 nun and 100 mm.

14. The combination according to claim 12, wherein the inner diameter is approximately 1 mm and the tube length is approximately 50 mm.

15. The combination according to claim 12, wherein the thickness of the tube wall is between 0.2 nun and 0.8 nun.

16. The combination according to claim 1, wherein the ratio of the value of a length of said tube means and the value of an inner diameter of said tube means is between 20 and 80.

17. The combination according to claim 12, wherein the ratio of the value of said length and the value of said inner diameter is a approximately 50.

18. The combination according to claim 1, wherein the ratio of the absolute pressure P2 at the other end of the tube means and the absolute pressure P1 at the one end of the tube means is:

$$P2/P1 = a*f b*e f*c$$

with the pressure PI at the one end of said tube means varying with a frequency f and constants a, b and c depending on the dimensions of the tube means.

19. The combination according to claim 17, wherein a is 0.416, b is −0.003 and c is −0.000186.

20. Pressure sensing device for measuring dynamic pressure variations within a gas turbine comprising the combination of an adaptor (10) according to claim 1 and a piezoelectric or piezoresistive pressure sensor (12) mounted to said adaptor (10).

* * * * *

UNITED STATES PATENT AND TRADEMARK OFFICE
CERTIFICATE OF CORRECTION

PATENT NO. : 5,612,497
DATED : March 18, 1997
INVENTOR(S) : Hilger A. Walter, Herwart Hönen, and Heinz E. Gallus It is certified that error appears in the above-indentified patent and that said Letters Patent is hereby corrected as shown below:

Column 4, line 28, "P2/P1=a*fb*ef*c" should read -- $P2/P1 = a * f^b * e^{f*c}$ --.

Column 8, line 64, "P2/P1=a*fb*ef*c" should read -- $P2/P1 = a * f^b * e^{f*c}$ --.

Column 12, line 1, "P2/P1=a*fb*ef*c" should read -- $P2/P1 = a * f^b * e^{f*c}$ --.

Under Related U.S. Application Data, Page 1, "Continuation-in-part of PCT/US93/05764, Jun. 16, 1993, published as WO94/03862, Feb. 17, 1994." should read -- Continuation-in-part of PCT/US93/05768, Jun. 16, 1993, published as WO94/03785, Feb. 17, 1994. --

Signed and Sealed this

Eighth Day of July, 1997

*Attest:*

BRUCE LEHMAN

*Attesting Officer*     *Commissioner of Patents and Trademarks*